United States Patent
Nam et al.

(10) Patent No.: US 11,187,370 B2
(45) Date of Patent: Nov. 30, 2021

(54) IMAGE PHOTOGRAPHING-ASSISTING ACCESSORY OF ELECTRONIC DEVICE

(71) Applicant: Samsung Electronics Co., Ltd., Gyeonggi-do (KR)

(72) Inventors: Minhyuk Nam, Seoul (KR); Yoonseok Kang, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/644,408

(22) PCT Filed: Aug. 23, 2018

(86) PCT No.: PCT/KR2018/009711
§ 371 (c)(1),
(2) Date: Mar. 4, 2020

(87) PCT Pub. No.: WO2019/054661
PCT Pub. Date: Mar. 21, 2019

(65) Prior Publication Data
US 2021/0062963 A1    Mar. 4, 2021

(30) Foreign Application Priority Data
Sep. 12, 2017  (KR) .................... 10-2017-0116575

(51) Int. Cl.
*F16M 11/20* (2006.01)
*F16M 11/18* (2006.01)
(Continued)

(52) U.S. Cl.
CPC .......... *F16M 11/205* (2013.01); *F16M 11/04* (2013.01); *F16M 11/10* (2013.01);
(Continued)

(58) Field of Classification Search
CPC ........ G03B 17/56; F16M 11/04; F16M 11/12; F16M 11/10; F16M 11/18
(Continued)

(56) References Cited

U.S. PATENT DOCUMENTS

| | | | |
|---|---|---|---|
| 2015/0261070 A1 | 9/2015 | Feng et al. | |
| 2017/0064176 A1 | 3/2017 | Kim | |
| 2017/0227162 A1* | 8/2017 | Saika | .................... F16M 11/18 |

FOREIGN PATENT DOCUMENTS

| | | |
|---|---|---|
| CN | 204901238 | 12/2015 |
| CN | 106029502 | 10/2016 |

(Continued)

OTHER PUBLICATIONS

PCT/ISA/210 Search Report issued on PCT/KR2018/009711, pp. 5.
PCT/ISA/237 Written Opinion issued on PCT/KR2018/009711, pp. 5.

*Primary Examiner* — Clayton E. LaBalle
*Assistant Examiner* — Kevin C Butler
(74) *Attorney, Agent, or Firm* — The Farrell Law Firm, P.C.

(57) ABSTRACT

Proposed is an image photographing-assisting accessory of an electronic device, which corrects shaking of an electronic device, the accessory comprising: a coupling unit to which the electronic device is coupled; a plurality of link rods connected to the coupling unit and rotatably coupled to each other; and a correcting unit formed at a part to which the link rods are rotatably coupled, wherein the correcting unit includes a fixing unit, a rotating unit rotating about the fixing unit, and a rotation locking unit for restraining the rotation of the rotating unit. Other embodiments are also possible.

13 Claims, 14 Drawing Sheets

(51) Int. Cl.
  *G03B 17/56*    (2021.01)
  *F16M 11/04*    (2006.01)
  *F16M 11/10*    (2006.01)
  *F16M 11/12*    (2006.01)

(52) U.S. Cl.
  CPC ............ *F16M 11/12* (2013.01); *F16M 11/18* (2013.01); *G03B 17/561* (2013.01); *G03B 17/563* (2013.01); *F16M 2200/021* (2013.01)

(58) Field of Classification Search
  USPC ....................................................... 396/428
  See application file for complete search history.

(56) References Cited

FOREIGN PATENT DOCUMENTS

| | | | | |
|---|---|---|---|---|
| JP | 2015177539 | | 10/2015 | |
| KR | 200463499 | | 11/2012 | |
| KR | 101667394 | | 10/2016 | |
| KR | 20170099073 | * | 8/2017 | ............ F16M 11/12 |
| KR | 1020170099073 | | 8/2017 | |

* cited by examiner

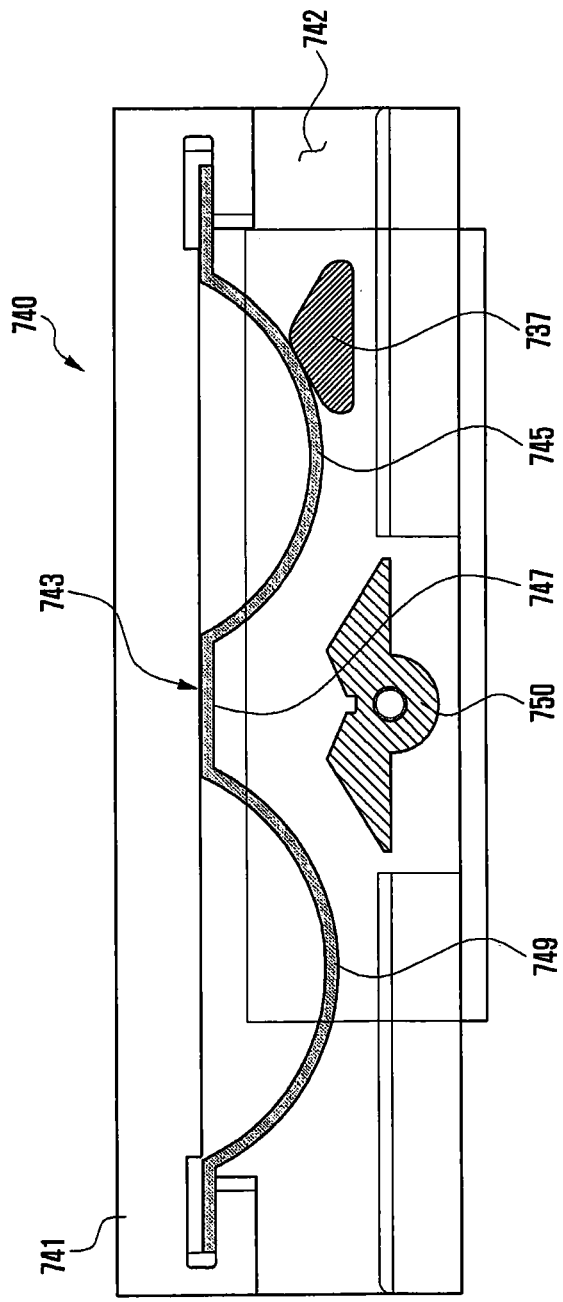

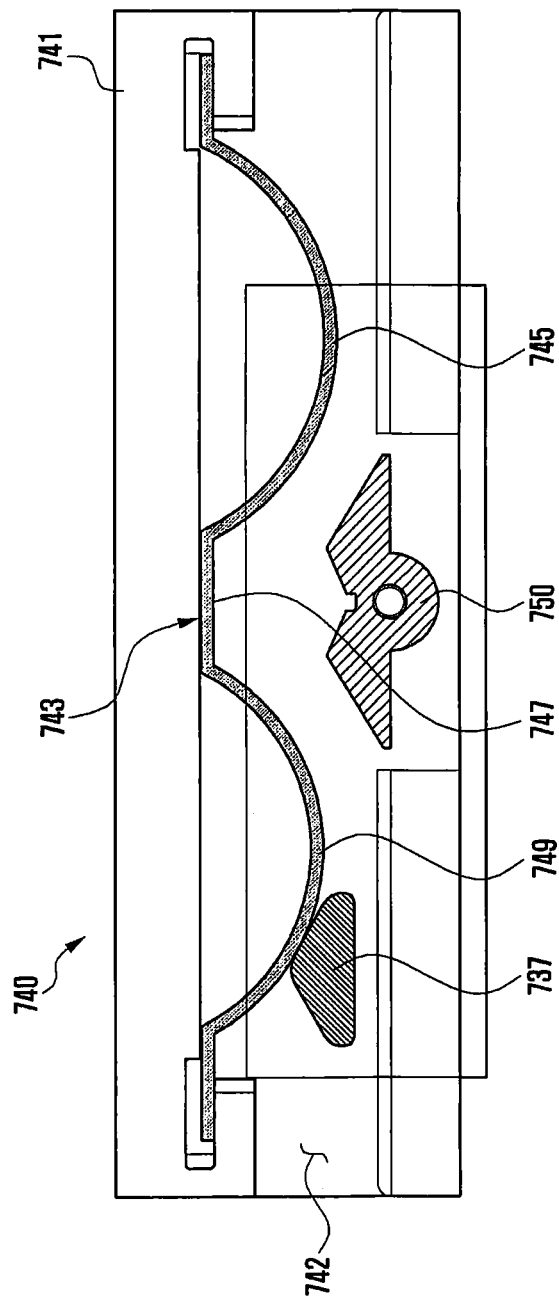

IMAGE PHOTOGRAPHING-ASSISTING ACCESSORY OF ELECTRONIC DEVICE

PRIORITY

This application is a National Phase Entry of PCT International Application No. PCT/KR2018/009711 which was filed on Aug. 23, 2018, and claims priority to Korean Patent Application No. 10-2017-0116575, which was filed on Sep. 12, 2017, the content of each of which is incorporated herein by reference.

TECHNICAL FIELD

The disclosure relates to an accessory that can assist image capturing in utilizing the image capture module of an electronic device.

BACKGROUND ART

With recent advances in hardware performance, image capturing devices are becoming lighter, thinner, shorter and smaller, and are oriented toward mobile convergence devices that encompass various capabilities of different devices.

Along with advances in hardware performance, the performance of camera modules embedded in mobile communication terminals is rapidly improving, which enables the mobile communication terminals to take high resolution videos.

As such, various accessory devices are being actively developed to improve shooting environments so that more stable and high quality images can be obtained.

DISCLOSURE OF INVENTION

Technical Problem

An embodiment of the disclosure may provide an image capture assisting accessory for an electronic device wherein the image capture assisting accessory includes a structure that can freely fix and release the rotation portion regardless of the rotation direction for correcting the shaking of the electronic device.

Solution to Problem

According to an embodiment of the disclosure, there is provided an image capture assisting accessory for an electronic device. The image capture assisting accessory may include: a coupling part configured to hold the electronic device; one or more link rods rotatably coupled with each other and connected to the coupling part; and at least one correction part formed at a portion where the link rods are rotatably coupled, wherein the correction part may include a fixing portion, a rotation portion rotatable about the fixing portion, and a rotation lock for restricting the rotation of the rotation portion.

Advantageous Effects of Invention

There is provided an image capture assisting accessory for an electronic device. The image capture assisting accessory enables the user to freely fix and release the rotation portion regardless of the rotation direction for correcting the shaking of the electronic device.

BRIEF DESCRIPTION OF DRAWINGS

FIGS. 7A to 7C illustrate an operation of the rotation lock of the image capture assisting accessory for an electronic device according to another embodiment of the disclosure.

FIGS. 8A to 8C illustrate an operation of the rotation lock of the image capture assisting accessory for an electronic device according to another embodiment of the disclosure.

MODE FOR THE INVENTION

Figure 1:
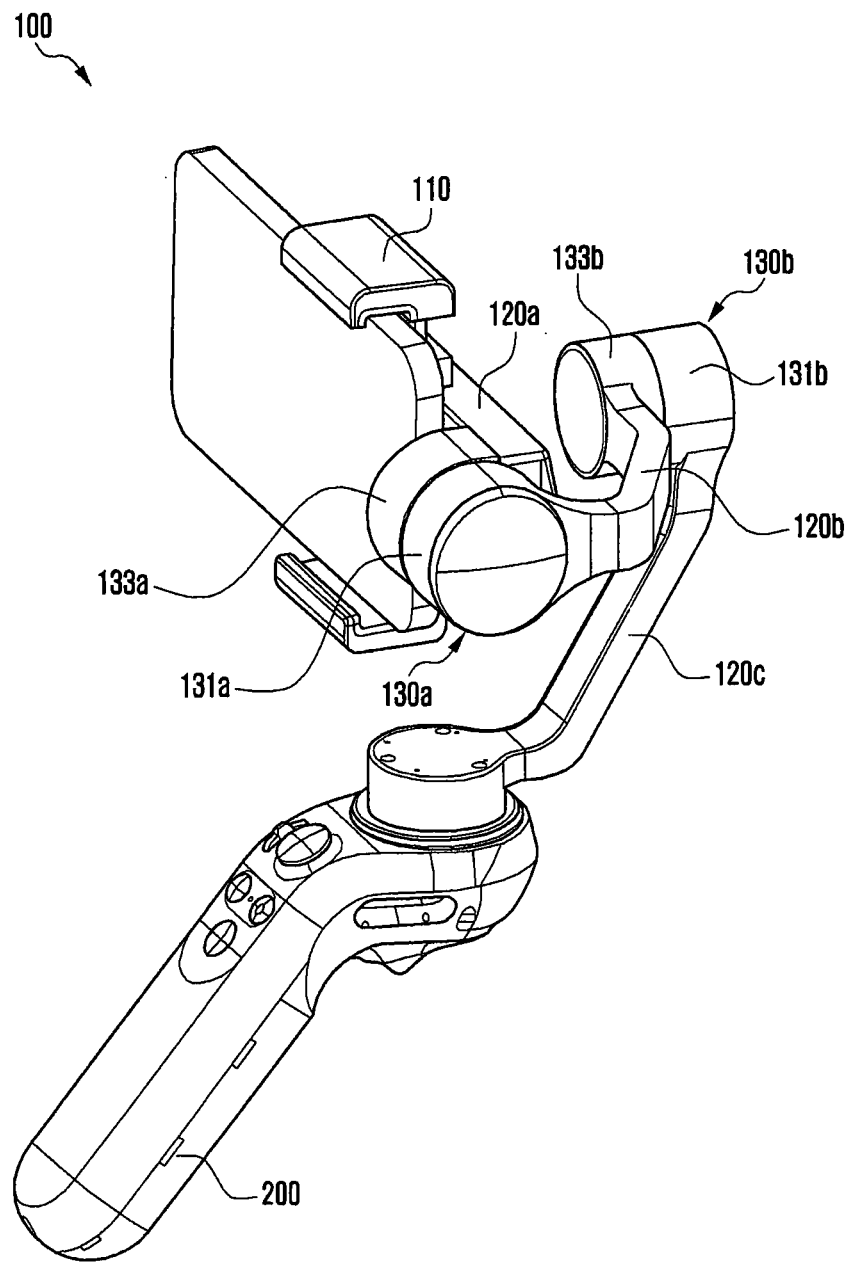
FIG. 1 is a perspective view of an image capture assisting accessory for an electronic device according to an embodiment of the disclosure.

Hereinafter, various embodiments of the disclosure are described in detail with reference to accompanying drawings. The embodiments and terms used herein are not intended to limit the technology disclosed in specific forms and should be understood to include various modifications, equivalents, and/or alternatives to corresponding embodiments. In the drawings, similar reference numbers are used to indicate similar constituent elements. As used herein, singular forms are intended to include the plural forms as well, unless the context clearly indicates otherwise. In the disclosure, the expression "A or B" or "at least one of A and/or B" is intended to include any possible combination of enumerated items. In the present disclosure, expressions such as "1st" or "first", "2nd" or "second", etc. may modify various components regardless of the order and/or the importance but do not limit corresponding components. When it is mentioned that a certain (first) component is "(functionally or communicatively) connected" to or "accessed" by another (second) component, it may be understood that the component is directly connected to or accessed by the other component or that still other (third) component is interposed between the two components.

In the disclosure, the expression "configured to ~" may be interchangeably used with other expressions "suitable for ~", "having the capacity to ~", "designed to ~", "adapted to ~", "made to ~", or "capable of ~". The expression "configured to (or set to) ~" may not necessarily mean "specifically designed to ~" in hardware. Instead, in some situations, the expression a device "configured to ~" may mean that the device is "capable of ~" with other devices or components.

FIG. 1 is a perspective view of an image capture assisting accessory 100 for an electronic device according to an embodiment of the disclosure.

The image capture assisting accessory 100 according to an embodiment of the disclosure may be an accessory that can be used to obtain a higher quality result when taking a photograph or a moving image through an image capture module of an electronic device.

In one embodiment, the image capture assisting accessory 100 for the electronic device may include a coupling part 110, at least one link rod 120, and at least one correction part 130.

The coupling part 110 may be a portion for holding the electronic device. For example, the coupling part 110 may hold the electronic device by using a fastening mechanism such as a clamp or a screw.

The at least one link rod 120 may be used to place the electronic device at a desired position in a three-dimensional space and separate the electronic device from the photographer. The plural link rods 120 may be rotatably coupled to absorb the displacement transmitted to the electronic device.

In one embodiment, the at least one link rod 120 of the image capture assisting accessory 100 for the electronic device may include a first link rod 120a, a second link rod 120b, and a third link rod 120c.

One end of the first link rod 120a may be connected to the coupling part 110, and the other end thereof may be rotatably coupled with one end of the second link rod 120b. One end of the second link rod 120b may be rotatably coupled with the other end of the first link rod 120a and the other end thereof may be rotatably coupled with the third link rod 120c. One end of the third link rod 120c may be rotatably coupled with the other end of the second link rod 120b, and the other end thereof may be rotatably coupled with the manipulation part 200. The manipulation part 200 is a portion held by the user, and various buttons 210 for manipulating the image capture assisting accessory 100 may be disposed thereat.

In the description, the manipulation part 200 is depicted as a bar-shaped handle so as to be easily gripped by the user, but it is not limited thereto. The manipulation part 200 may be formed in the shape of a belt or a bracelet so as to be worn on the user's body. The manipulation part 200 may also be formed in the shape of a bolt or clip fastener so as to be coupled to other devices.

For ease of understanding, the description of link rods will be focused on the second link rod 120b among the first to third link rods 120a to 120c. Further, for clarity, the second link rod 120b will be referred to as the link rod 120 in the following description.

The correction part 130 may refer to a portion where the plural link rods 120 are rotatably coupled to each other. The correction part 130 may be formed corresponding to the axes (e.g., three axes) defining a three-dimensional space. The displacement transmitted to the electronic device from the photographer is decomposed into three-axis components, and the link rod 120 is rotated by the motor embedded in the three-axis correction part 130 in a direction absorbing each displacement component, thereby preventing the shaking of the electronic device.

As described above, the displacement generated by the shock or vibration transmitted through the photographer during the shooting stage using the electronic device is absorbed by the correction part 130 disposed about the axes (e.g., three axes) defining a three-dimensional space, so that the displacement is not transmitted to the electronic device.

In one embodiment, the correction part 130 of the image capture assisting accessory 100 for the electronic device may include a first correction part 130a, a second correction part 130b, and a third correction part 130c.

The first correction part 130a may be formed at a portion where the first link rod 120a and the second link rod 120b are rotatably coupled. The second correction part 130b may be formed at a portion where the second link rod 120b and the third link rod 120c are rotatably coupled. The third correction part 130c may be formed at a portion where the third link rod 120c and the manipulation part 200 are rotatably coupled.

The first to third correction parts 130a to 130c may be formed corresponding to the axes defining a three-dimensional space, thereby preventing shaking of the electronic device. Specifically, in a relationship between the correction part 130 and the three axes of a three-dimensional space defined by assuming that the direction of the front of the electronic device in FIG. 1 is the X axis, the first correction part 130a may correct the displacement due to the pitch movement in which the electronic device shakes with respect to the Y axis. The second correction part 130b may correct the displacement due to the roll movement in which the electronic device shakes with respect to the X axis. The third correction part 130c may correct the displacement due to the yaw movement in which the electronic device shakes with respect to the Z axis.

A description has been given above of a case where the three-axis displacements are corrected through the first to third link rods 120a to 120c and the first to third correction parts 130a to 130c. However, the disclosure is not limited thereto. With the increasing or decreasing number of link rods, the number of axes for displacement correction may change according to an increase or decrease in the number of correction parts.

For ease of understanding, the description of correction parts will be focused on the second correction part 130b among the first to third correction parts 130a to 130c. Further, for clarity, the second correction part 130b will be referred to as the correction part 120 in the following description.

Figure 2:
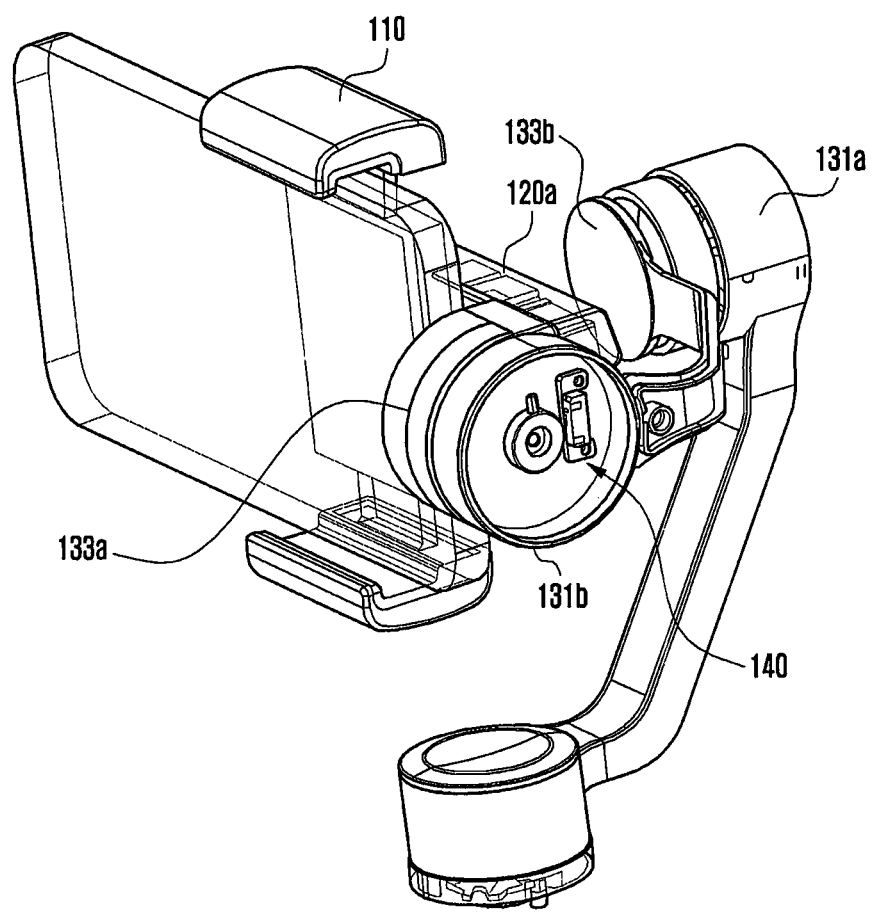
FIG. 2 illustrates the position where a rotation lock is disposed in the image capture assisting accessory for an electronic device according to an embodiment of the disclosure.
Figure 3:
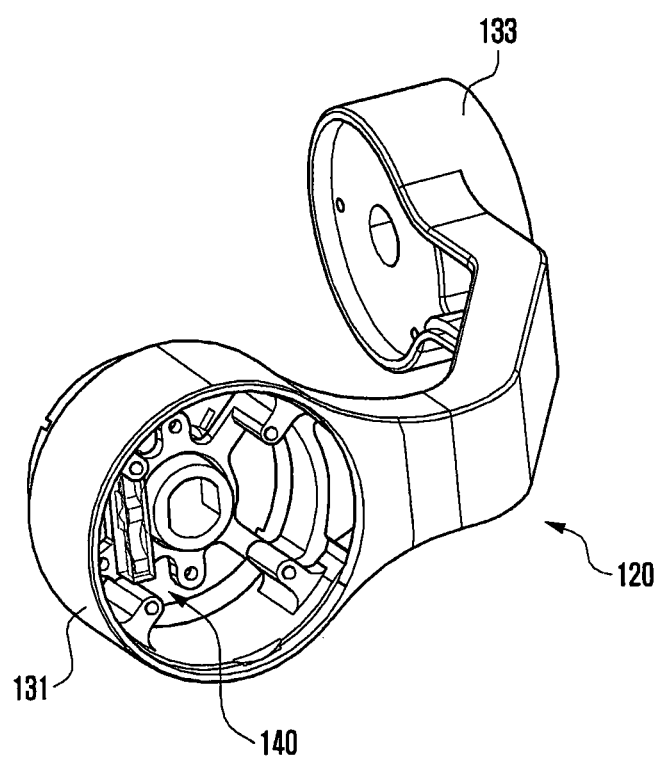
FIG. 3 illustrates a link rod of the image capture assisting accessory for an electronic device according to an embodiment of the disclosure.

FIG. 2 shows the correction part 130 of the image capture assisting accessory and the position of the rotation lock 140 disposed within the correction part 130 according to an embodiment of the disclosure. FIG. 3 shows the link rod 120 of the image capture assisting accessory for an electronic device according to an embodiment of the disclosure.

With reference to FIG. 2, the correction part 130 may include a fixing portion 131, a rotation portion 133, and a rotation lock 140. The fixing portion 131 may serve as a support for the rotation portion 133 to rotate. Power of the rotation portion 133 may be supplied through a power unit such as a motor. For example, the motor may be an outer rotor type brushless DC (BLDC) motor.

A power unit such as a motor may require the supply of power for driving. However, as it is difficult for each link rod 120 to embed a battery for power supply, a power source may be separately arranged to supply power. A medium such as a wire can be used for power supply.

In addition, it is necessary to transmit and receive a signal for controlling the correction part 130. Signal transmission and reception may require connections via a medium such as a flexible printed circuit board (FPCB).

The medium connected to the motor (e.g., wire or FPCB) may be disconnected by twisting occurring at a site where the link rods 120 rotate with each other (e.g., correction part 130). Hence, by utilizing a component such as a slip ring (not shown), the correction part 130 can be freely rotated and power can be smoothly supplied.

Figure 4:
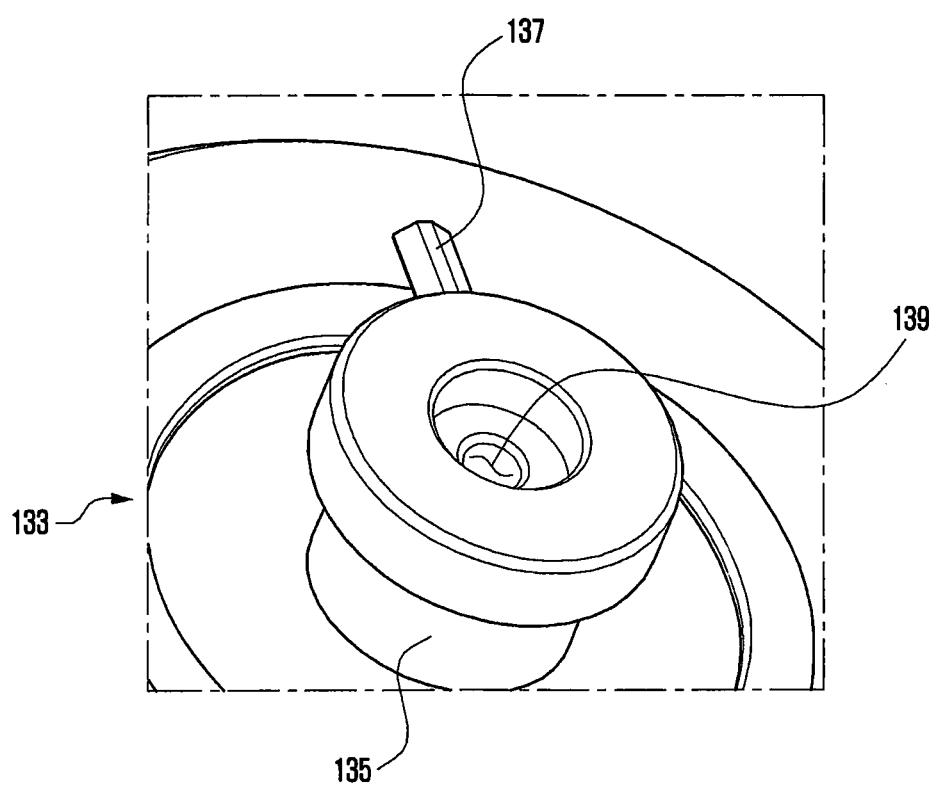
FIG. 4 illustrates a rotation portion of the image capture assisting accessory for an electronic device according to an embodiment of the disclosure.

The medium connected to the motor may pass through a hole 139 (in FIG. 4). In this case, it is possible to prevent damage to the medium by using a hinge fixing member 750 to be described later with reference to FIGS. 7A to 7C.

The rotation lock 140 may restrain the rotation between the link rods 120. When the image capture assisting accessory is not used for the electronic device, the rotation between the link rods 120 may be constrained to protect the electronic device and the correction part 130.

When the power is cut off because the image capture assisting accessory is not used for the electronic device, the rotation of the rotation portion 133 may damage the motor. When the electronic device is held by the coupling part 110, damage may occur due to an unexpected collision with an obstacle.

In one embodiment, the image capture assisting accessory may restrain the rotation portion 133 by using the rotation lock 140. Thereby, the rotation between the link rods 120 may be restrained, preventing damage to the motor or the electronic device.

FIG. 4 illustrates the rotation portion 133 of the image capture assisting accessory for an electronic device according to an embodiment of the disclosure.

With reference to FIG. 4, the rotation portion 133 may include a protrusion 135 that projects toward the fixing portion 131 (in FIG. 3) to provide the center of rotation for the rotation portion 133, and a hinge 137 that protrudes from the outer circumferential surface of the protrusion 135 and is coupled to or separated from the rotation lock 140 (in FIG. 3).

The protrusion 135 may be separately formed and coupled to the rotation portion 133, or may be integrally formed with the rotation portion 133.

The hinge 137 may be separately formed and coupled to the outer circumferential surface of the protrusion 135, or may be integrally formed with the protrusion 135. As the hinge 137 is coupled with the protrusion 135 and the protrusion 135 is coupled with the rotation portion 133, when the movement of the hinge 137 is limited, the rotation of the rotation portion 133 may be restricted.

The hinge 137 may rotate with the rotation of the rotation portion 133, and an inclined surface may be formed with respect to the tangential direction of the rotation. For example, the cross section of the hinge 137 may be formed as a triangle. This may facilitate restraint and release of the rotation portion 133 through the rotation lock 140 (in FIG. 3).

Figure 5:
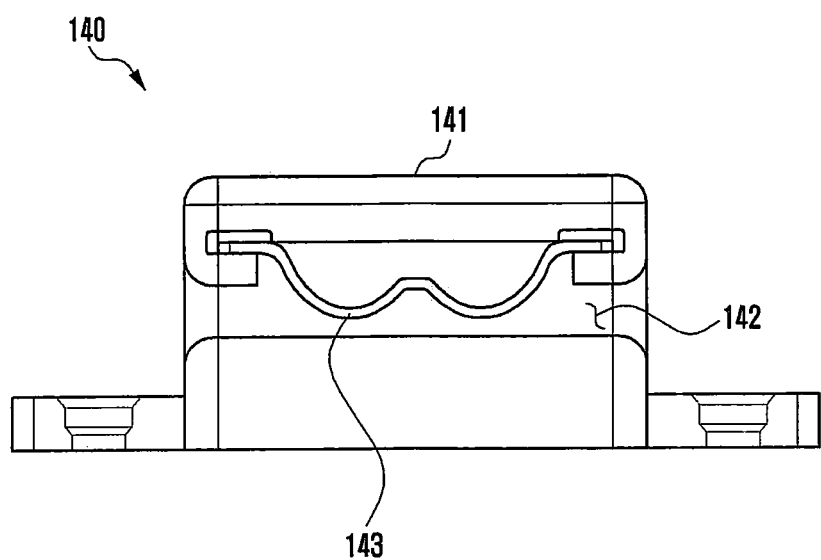
FIG. 5 illustrates a rotation lock of the image capture assisting accessory for an electronic device according to an embodiment of the disclosure.

FIG. 5 illustrates the rotation lock 140 of the image capture assisting accessory for an electronic device according to an embodiment of the disclosure.

With reference to FIG. 5, the rotation lock 140 may include a housing 141 and an elastic body 143, and may be disposed to overlap the rotation radius of the hinge 137 shown in FIG. 4.

The housing 141 may be disposed to overlap the rotation radius of the hinge 137 (in FIG. 4), and a slit 142 may be formed along the movement path of the hinge 137 so as not to interfere with the hinge 137.

The elastic body 143 may be disposed to overlap the rotation radius of the hinge 137 in the housing 141 and may be disposed to overlap the movement path of the hinge 137 so as to apply an elastic force to the hinge 137, limiting the rotation of the hinge 137.

The elastic body 143 may be a flat spring and may include a first elastic section 145, a fixed section 147, and a second elastic section 149. The first elastic section 145 may be formed so that the flat spring is curved toward the slit 142 to overlap the movement path of the hinge 137 (in FIG. 4). The fixed section 147 following the first elastic section 145 may be a portion not overlapping the movement path of the hinge 137. Like the first elastic section 145, the second elastic section 149 following the fixed section 147 may be formed so that the flat spring is curved toward the slit 142 to overlap the movement path of the hinge 137.

The elastic force applied by the first elastic section 145 and the second elastic section 149 to the hinge 137 (in FIG. 4) may limit the rotation of the hinge 137, thereby restricting the rotation of the rotation portion 133 (in FIG. 4).

Figure 6A:
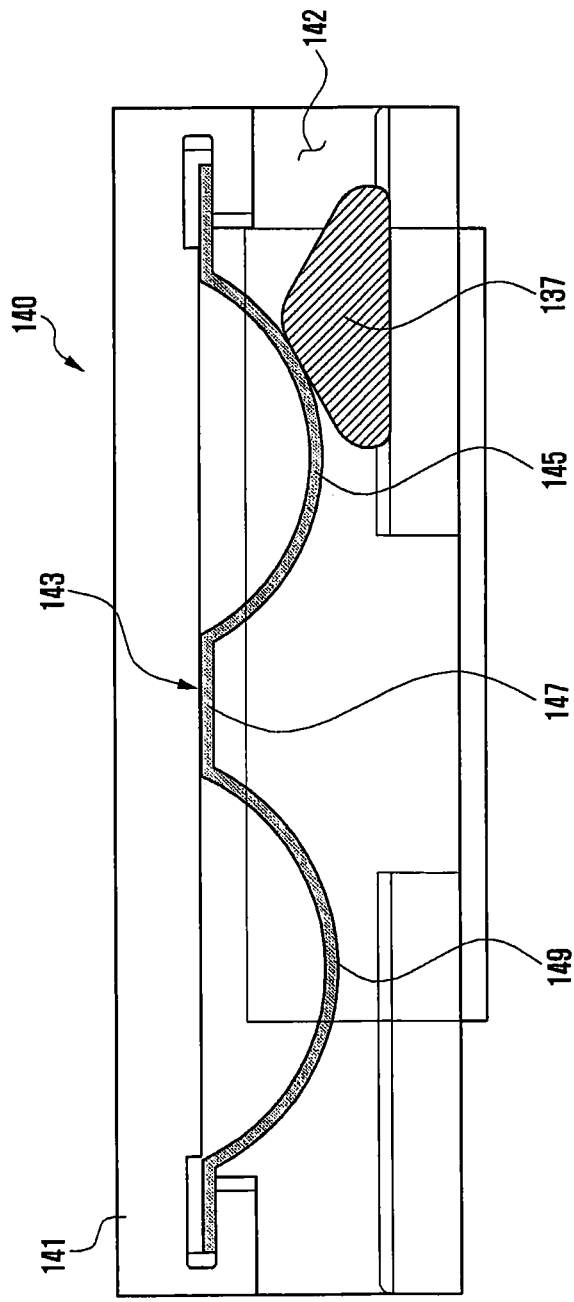
FIGS. 6A to 6C illustrate an operation of the rotation lock of the image capture assisting accessory for an electronic device according to an embodiment of the disclosure.
Figure 6B:
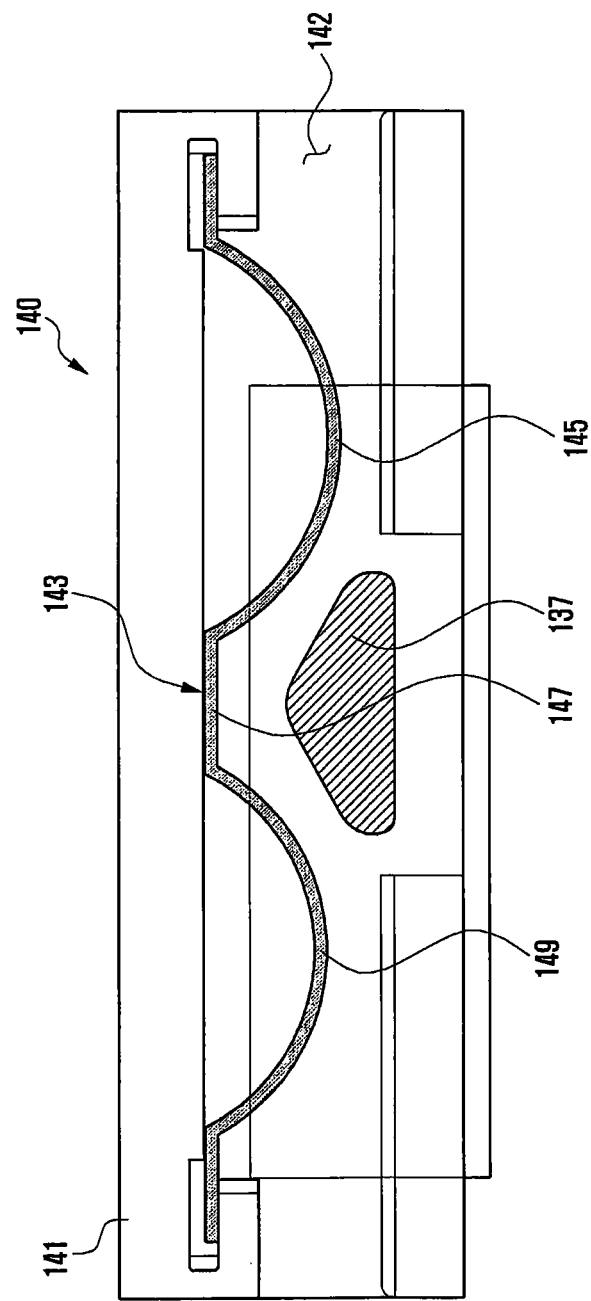
Figure 6C:
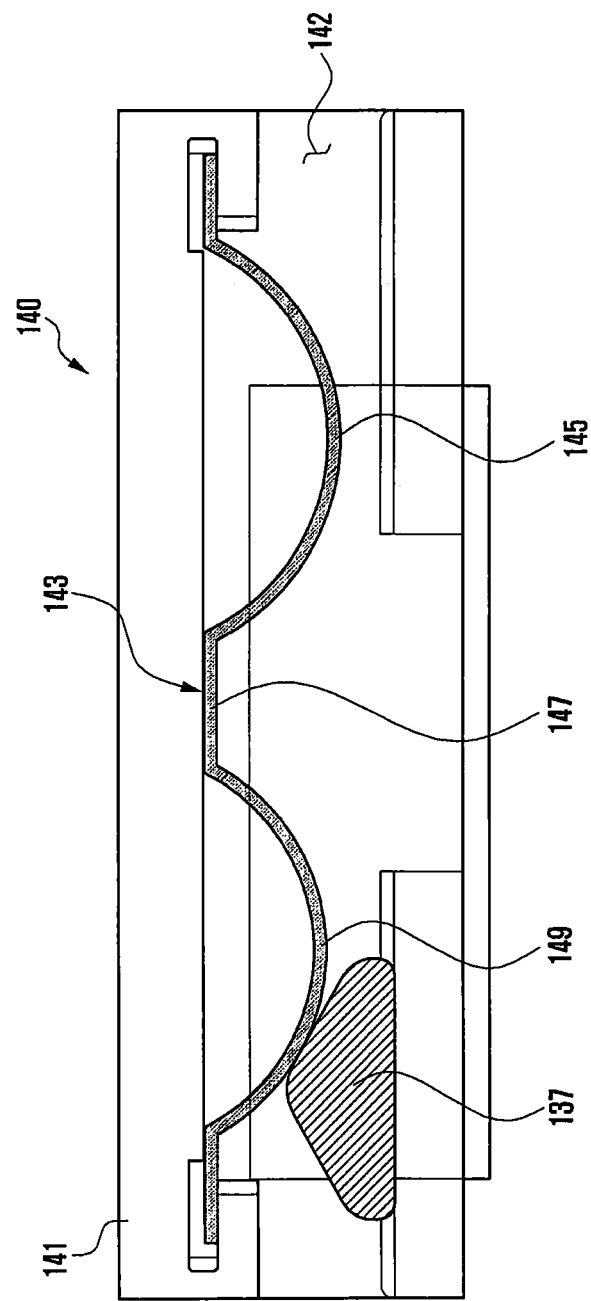

FIGS. 6A to 6C illustrate an operation of the rotation lock 140 of the image capture assisting accessory for an electronic device according to an embodiment of the disclosure.

For ease of understanding, direction related terms such as left or right may be used with respect to the illustration in FIGS. 6A to 6C, but they are not absolute criteria.

As shown in FIG. 6A, when the hinge 137 is rotated from right to left and contacts the first elastic section 145, an elastic force is applied to the hinge 137 and the rotation of the hinge 137 may be restricted first. Here, as the cross section of the hinge 137 is of a triangular shape, when an external force of a specific magnitude or greater is applied, as shown in FIG. 6B, the hinge 137 may deform the first elastic section 145 along the inclined surface and reach the fixed section 147. If no additional external force is applied in this state (e.g., an external force of less than a specific magnitude is applied), the rotation of the hinge 137 may be limited to within the fixed section 147 by the elastic force of the first elastic section 145 and the second elastic section 149. Thereby, the rotation of the rotation portion 133 (in FIG. 4) may be restricted (e.g., fixed) within a specific range.

As shown in FIG. 6C, when an external force is applied again so as to rotate the hinge 137 from right to left, the hinge 137 is released from the rotation lock 140 while deforming the second elastic section 149, permitting the rotation portion 133 (in FIG. 4) to freely rotate. In reverse, when an external force is applied so as to rotate the hinge 137 from left to right, the hinge 137 is released from the rotation lock 140 while deforming the first elastic section 145, permitting the rotation portion 133 (in FIG. 4) to freely rotate in the same manner as above.

Similarly, as shown in FIG. 6C, when the hinge 137 is rotated from left to right and contacts the second elastic section B149, an elastic force is applied to the hinge 137 and the rotation of the hinge 137 may be restricted first. Here, as the cross section of the hinge 137 is of a triangular shape, when an external force of a specific magnitude or greater is applied, as shown in FIG. 6B, the hinge 137 may deform the second elastic section 149 along the inclined surface and reach the fixed section 147. If no additional external force is applied in this state (e.g., an external force of less than a specific magnitude is applied), the rotation of the hinge 137 may be limited to within the fixed section 147 by the elastic force of the first elastic section 145 and the second elastic section 149. Thereby, the rotation of the rotation portion 133 (in FIG. 4) may be restricted (e.g., fixed) within a specific range.

As shown in FIG. 6A, when an external force is applied again so as to rotate the hinge 137 from left to right, the hinge 137 is released from the rotation lock 140 while deforming the first elastic section 145, permitting the rotation portion 133 (in FIG. 4) to freely rotate. In reverse, when an external force is applied so as to rotate the hinge 137 from right to left, the hinge 137 is released from the rotation lock 140 while deforming the second elastic section 149, permitting the rotation portion 133 (in FIG. 4) to freely rotate in the same manner as above.

Figure 7B:
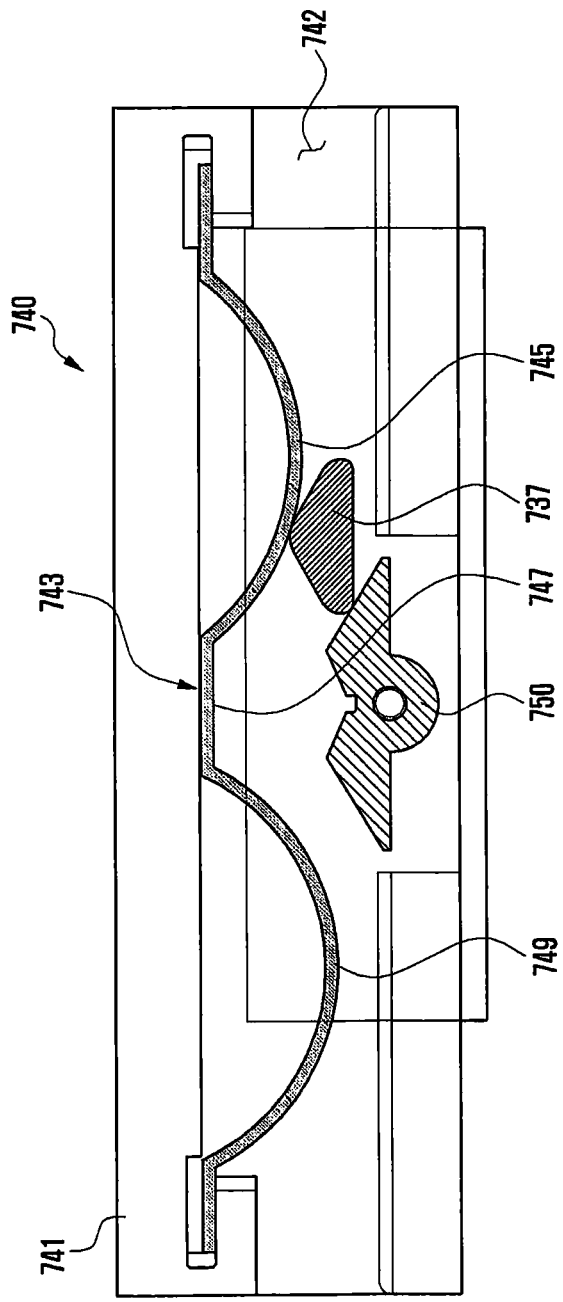
Figure 7C:
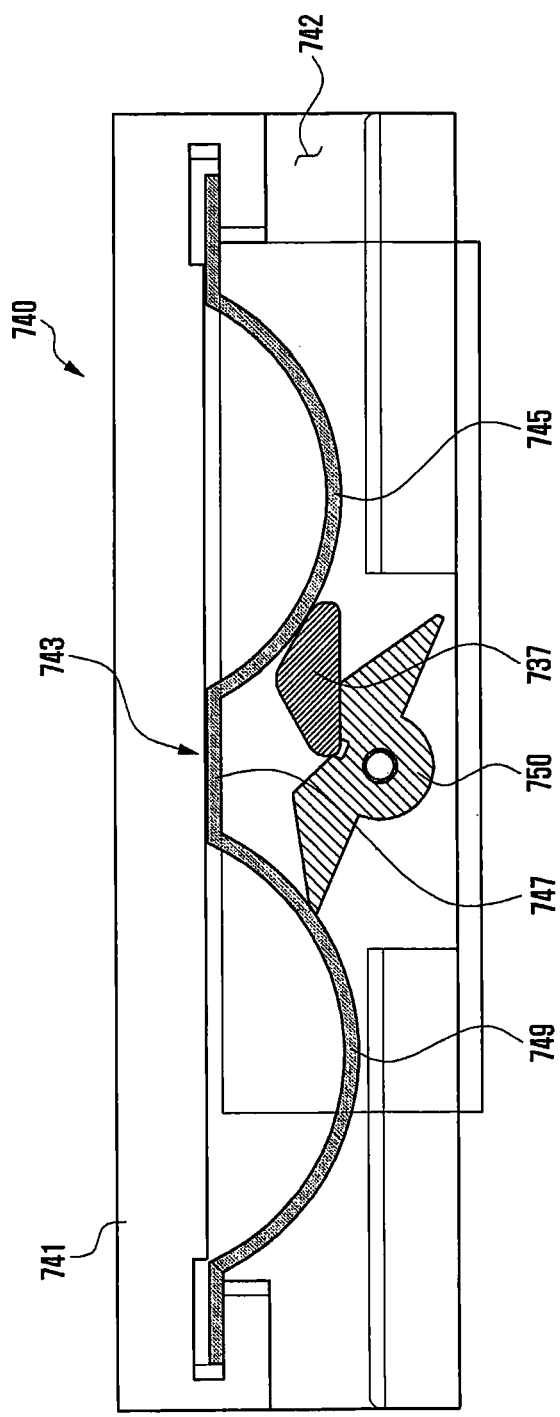
Figure 8B:
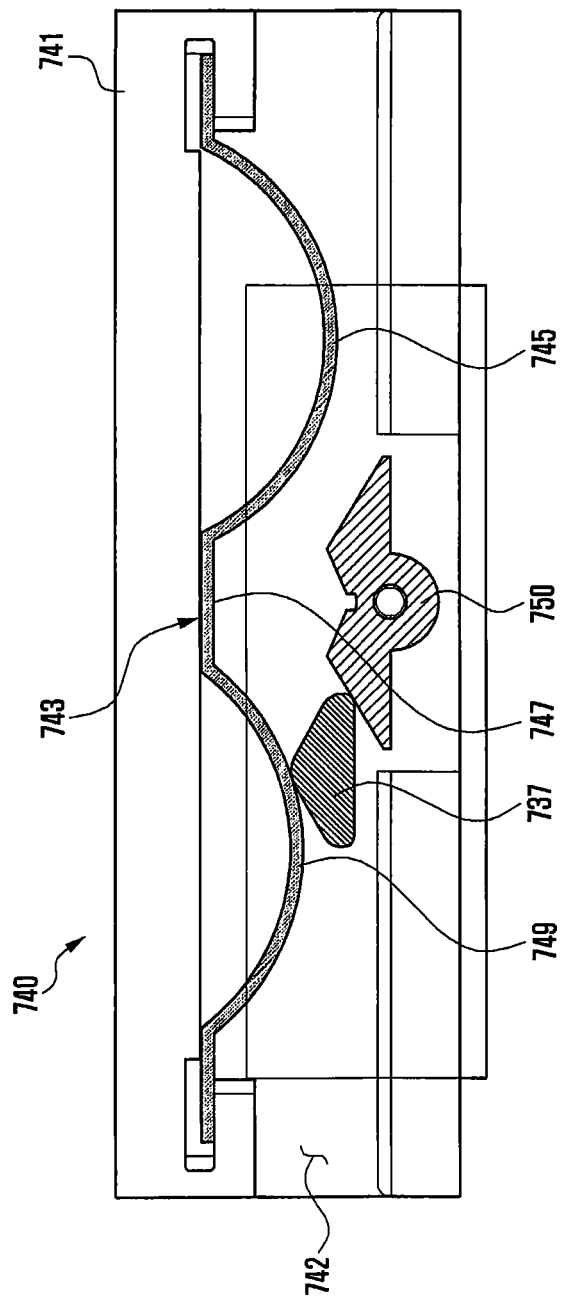
Figure 8C:
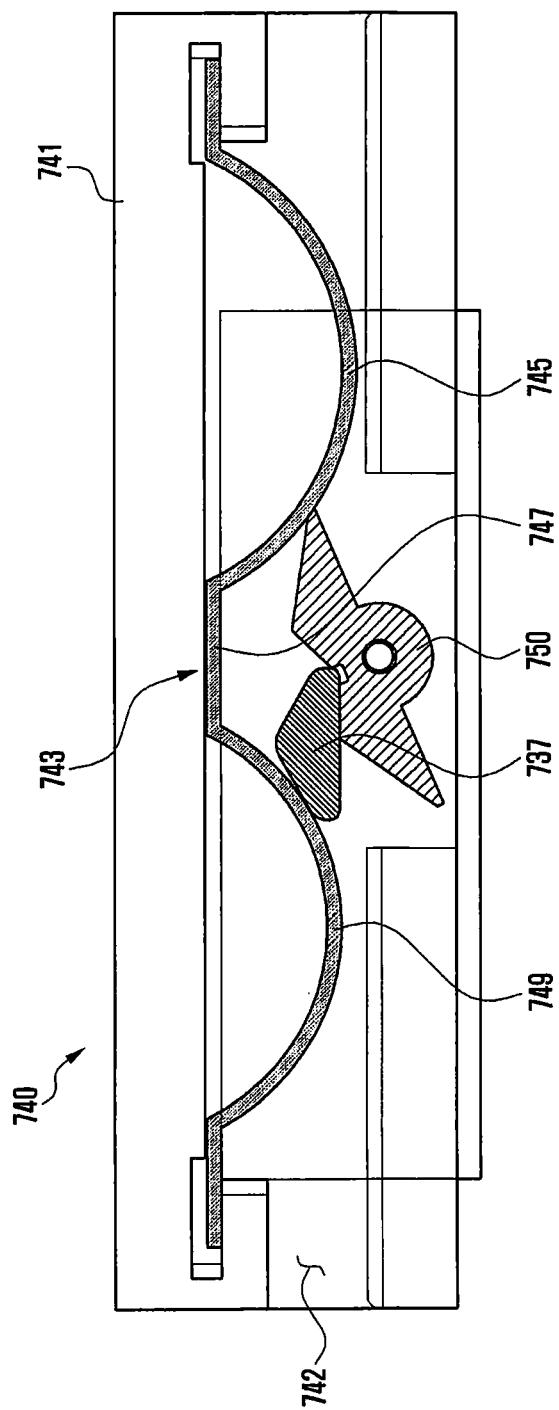

FIGS. 7A to 7C illustrate an operation of the rotation lock 740 of the image capture assisting accessory for an electronic device according to another embodiment of the disclosure, and FIGS. 8A to 8C illustrate an operation of the rotation lock 740 when working in a direction opposite to that of FIGS. 7A to 7C.

For ease of understanding, as in the case of FIGS. 6A to 6C, direction related terms such as left or right may be used with respect to the illustration in FIGS. 7A to 7C and FIGS. 8A to 8C, but they are not absolute criteria.

In another embodiment of the disclosure, the rotation lock 740 may further include a hinge fixing member 750. The hinge fixing member 750 may be positioned corresponding to the fixed section 747, and may be formed to enable the seesaw motion with respect to the movement path of the hinge 737. The hinge fixing member 750 may have an uphill inclined surface with respect to the entrance direction of the hinge 737 and a downhill inclined surface toward the axis of the seesaw motion, and may be symmetrically formed about the axis of the seesaw motion.

The hinge fixing member 750 may prevent the hinge 737 from fully passing through the rotation lock 740 while maintaining the movement direction.

With reference to FIG. 7A, as in the case of FIG. 6A, when the hinge 737 is rotated from right to left and contacts the first elastic section 745, an elastic force is applied to the hinge 737 and the rotation of the hinge 737 may be restricted first. Here, as the cross section of the hinge 737 is of a triangular shape, when an external force of a specific magnitude or greater is applied, as shown in FIG. 7B, the hinge 737 may deform the first elastic section 745 along the inclined surface and reach the fixed section 747. Thereby, the rotation of the rotation portion 133 (in FIG. 4) may be restricted (e.g., fixed) within a specific range.

As shown in FIG. 7C, when the hinge 737 reaches the fixed section 747, the hinge 737 contacts the hinge fixing member 750, preventing the hinge 737 from rotating from right to left within the rotation lock 740.

Once the hinge 737 reaches the fixed section 747 from right to left, only when an external force is applied so as to rotate the hinge 737 from left to right, the hinge 737 may be released from the rotation lock 740, permitting the rotation portion 133 (in FIG. 1) to freely rotate.

In reverse, as shown in FIG. 8A, when the hinge 737 is rotated from left to right and contacts the second elastic section 749, an elastic force is applied to the hinge 737 and the rotation of the hinge 737 may be restricted first. Here, as the cross section of the hinge 737 is of a triangular shape, when an external force of a specific magnitude or greater is applied, as shown in FIG. 8B, the hinge 737 may deform the second elastic section 749 along the inclined surface and reach the fixed section 747. Thereby, the rotation of the rotation portion 133 (in FIG. 4) may be restricted (e.g., fixed) within a specific range.

With reference to FIG. 8C, as in the case of FIG. 7C, when the hinge 737 reaches the fixed section 747, the hinge 737 contacts the hinge fixing member 750, preventing the hinge 737 from rotating from left to right within the rotation lock 740.

Once the hinge 737 reaches the fixed section 747 from left to right, only when an external force is applied so as to rotate the hinge 737 from right to left, the hinge 737 may be released from the rotation lock 740, permitting the rotation portion 133 (in FIG. 1) to freely rotate.

According to an embodiment of the disclosure, an image capture assisting accessory for an electronic device may include: a coupling part configured to hold the electronic device; one or more link rods rotatably coupled with each other and connected to the coupling part; and at least one correction part formed at a portion where the link rods are rotatably coupled, wherein the correction part may include a fixing portion, a rotation portion that rotates about the fixing portion, and a rotation lock that restricts the rotation of the rotation portion.

The link rods may include: a first link rod having one end connected to the coupling part; a second link rod having one end rotatably coupled with the other end of the first link rod; and a third link rod having one end rotatably coupled with the other end of the second link rod and the other end rotatably coupled with a manipulation part.

The at least one correction part may include: a first correction part formed at a portion where the first link rod and the second link rod are rotatably coupled; a second correction part formed at a portion where the second link rod and the third link rod are rotatably coupled; and a third correction part formed at a portion where the third link rod and the manipulation part are rotatably coupled.

The fixing portion is formed at one end of the corresponding link rod, the rotation portion is formed at the other end of the link rod, the fixing portion formed at one of the link rods and the rotation portion formed at another one of the link rods are rotatably coupled, and the rotation lock is disposed at the fixing portion to restrict or release the rotation of the rotation portion.

The correction part may further include a protrusion projecting from the rotation portion toward the fixing portion and providing the center of rotation of the rotation portion, and a hinge projecting from the outer circumferential surface of the protrusion and coupled to or separated from the rotation lock.

The rotation lock may be disposed to overlap the rotation radius of the hinge with respect to the rotation center of the rotation portion.

The rotation lock may include a housing and an elastic body, and the housing is disposed to overlap the rotation radius of the hinge and a slit is formed along the movement path of the hinge.

The elastic body may be disposed in the housing so as to overlap the rotation radius of the hinge, and it is arranged so as to overlap the movement path of the hinge, providing an elastic force to the hinge.

The elastic body having a flat spring shape may include: a first elastic section that is curved toward the slit and protrudes to overlap the movement path of the hinge; a fixed section extending from the first elastic section; and a second elastic section that is extending from the fixed section and is curved to protrude so as to overlap the movement path of the hinge.

The protrusion may have a through hole formed along the rotation axis direction of the rotation portion.

The rotation lock may further include a hinge fixing member that is disposed at a position corresponding to the fixed section in the slit and prevents, when the hinge enters the slit, the hinge from being released from the rotation lock after passing through the fixed section while maintaining the movement direction.

The hinge fixing member may be formed to enable the seesaw motion with respect to the movement path of the hinge, and may have an uphill inclined surface with respect to the entrance direction of the hinge and a downhill inclined surface toward the axis of the seesaw motion.

The correction part may be formed corresponding to the three axes defining a three-dimensional space.

The image capture assisting accessory may further include a slip ring disposed at the correction part.

The invention claimed is:

1. An image capture assisting accessory capable of correcting shaking of an electronic device, comprising:
a coupling part configured to hold the electronic device;
one or more link rods rotatably coupled with each other and connected to the coupling part; and
at least one correction part formed at a portion where the link rods are rotatably coupled,
wherein the correction part includes a fixing portion, a rotation portion rotatable about the fixing portion, and a rotation lock for restricting the rotation of the rotation portion, and
wherein the correction part further includes:
a protrusion projecting from the rotation portion toward the fixing portion and providing the center of rotation of the rotation portion; and
a hinge projecting from the outer circumferential surface of the protrusion and coupled to or separated from the rotation lock.

2. The image capture assisting accessory of claim 1, wherein the link rods include:
a first link rod having one end connected to the coupling part;
a second link rod having one end rotatably coupled with the other end of the first link rod; and
a third link rod having one end rotatably coupled with the other end of the second link rod and the other end rotatably coupled with a manipulation part.

3. The image capture assisting accessory of claim 2, wherein the at least one correction part includes:
a first correction part formed at a portion where the first link rod and the second link rod are rotatably coupled;
a second correction part formed at a portion where the second link rod and the third link rod are rotatably coupled; and
a third correction part formed at a portion where the third link rod and the manipulation part are rotatably coupled.

4. The image capture assisting accessory of claim 1, wherein:
the fixing portion is formed at one end of the corresponding link rod and the rotation portion is formed at the other end of the link rod;
the fixing portion formed at one of the link rods and the rotation portion formed at another one of the link rods are rotatably coupled; and
the rotation lock is disposed at the fixing portion to impose or lift restrictions on the rotation of the rotation portion.

5. The image capture assisting accessory of claim 1, wherein the rotation lock is disposed so as to overlap the rotation radius of the hinge with respect to the rotation center of the rotation portion.

6. The image capture assisting accessory of claim 5, wherein the rotation lock includes a housing and an elastic body, and wherein the housing is disposed so as to overlap the rotation radius of the hinge and a slit is formed along the movement path of the hinge.

7. The image capture assisting accessory of claim 6, wherein the elastic body is disposed in the housing so as to overlap the rotation radius of the hinge and the elastic body is arranged so as to overlap the movement path of the hinge, providing an elastic force to the hinge.

8. The image capture assisting accessory of claim 7, wherein the elastic body configured to a flat spring shape and includes:
a first elastic section that is curved toward the slit and protrudes to overlap the movement path of the hinge;
a fixed section extending from the first elastic section; and
a second elastic section that is extending from the fixed section and is curved to protrude so as to overlap the movement path of the hinge.

9. The image capture assisting accessory of claim 8, further comprising a hinge fixing member that is disposed at a position corresponding to the fixed section in the slit and prevents, when the hinge enters the slit, the hinge from being separated from the rotation lock after passing through the fixed section while maintaining the movement direction.

10. The image capture assisting accessory of claim 9, wherein the hinge fixing member is formed to enable the seesaw motion with respect to the movement path of the hinge, and includes an uphill inclined surface with respect to the entrance direction of the hinge and a downhill inclined surface toward the axis of the seesaw motion.

11. The image capture assisting accessory of claim 1, wherein the protrusion has a through hole formed along the rotation axis direction of the rotation portion.

12. The image capture assisting accessory of claim 1, wherein the correction part is formed corresponding to the three axes of three-dimensional space.

13. The image capture assisting accessory of claim 1, further comprising a slip ring disposed at the correction part.

* * * * *